United States Patent [19]

Kanamori

[11] Patent Number: 5,265,194
[45] Date of Patent: Nov. 23, 1993

[54] ROBOT CONTROL SYSTEM
[75] Inventor: Junichiro Kanamori, Kariya, Japan
[73] Assignee: Nippondenso Co., Ltd., Kariya, Japan
[21] Appl. No.: 769,428
[22] Filed: Oct. 1, 1991
[30] Foreign Application Priority Data
  Oct. 2, 1990 [JP]  Japan .................................. 2-266125
[51] Int. Cl.⁵ ............................................. G05B 19/18
[52] U.S. Cl. ...................................................... 395/89
[58] Field of Search .......................................... 395/89

[56] References Cited

U.S. PATENT DOCUMENTS

| | | | |
|---|---|---|---|
| 4,362,977 | 12/1982 | Evans et al. | 318/568 |
| 4,817,017 | 3/1989 | Kato | 364/513 |
| 4,908,777 | 3/1990 | Wolfe | 364/513 |
| 4,972,347 | 11/1990 | Tarvin et al. | 364/474.28 |
| 5,136,223 | 8/1992 | Karakama et al. | 318/573 |

FOREIGN PATENT DOCUMENTS

60-196808 10/1985 Japan .
61-253508 11/1986 Japan .
62-72004 4/1987 Japan .
63-310011 12/1988 Japan .
62-251315 4/1989 Japan .

Primary Examiner—Michael R. Fleming
Assistant Examiner—Robert W. Downs
Attorney, Agent, or Firm—Cushman, Darby & Cushman

[57] ABSTRACT

A robot control system which automatically improves the success rate of work performed by a robot even if the worked object is unmeasurable or unobservable by a distance on visual sensor. The control system includes a work judging unit which determines the success rate of work performed at a teaching point of the robot. The control system also includes a search judging unit which judges the result of work at each of a plurality of searching points to determine a success rate of work performed at the searching points. A search instruction unit causes the robot to move to the plurality of search points around the teaching point to perform work or search thereat. A correction unit corrects the teaching point based on the relative relation between the success rate of the work at the teaching point and the success rate at each of the searching points.

18 Claims, 8 Drawing Sheets

FIG. 13

ROBOT CONTROL SYSTEM

BACKGROUND OF THE INVENTION

1. Field of the Invention

This invention relates to a robot or program-controlled manipulator serving to assemble parts to a workpiece or object to be worked by fitting, inserting and screwing the parts into the workpiece or worked object, and more particularly, to a robot control system.

2. Description of the Prior Art

Heretofore, industrial robots such as teaching playback robots, for example, have been used in part assembling apparatuses to position the part in the same point and repeat the same work every time. Thus, assembling the part to the workpiece or worked object since they are generally excellent in repetitive playback performance. Therefore, it is necessary to teach the robot the points at which the success rate of assembling work is the highest, that is, the best working points, as teaching points.

The worked object such as substrate to which the part is to be assembled is fixed in a certain position by a positioning mechanism. However, due to limitations in the accuracy of the worked object and the performance of the positioning mechanism, the position in which the worked object is fixed is scattered or varied about a certain central value within a certain extent. For this reason, the central should be taught value to a tool or work executive section of the robot. Furthermore, since the central value varies in accordance with the lot of products (numbers of products) and change of the air temperature, it has been impossible for an operator to measure the central value for every work.

To cope with this, such a method has been proposed in Japanese Patent Unexamined Publication Nos. 60-196808 and 61-253508 that the position in which the worked object is fixed is measured beforehand using an exclusive distance sensor or visual sensor so as to correct automatically the teaching points of the work executive section.

In the conventional method, however, use of the distance sensor or visual sensor limited the worked object to such things that can be measured by the distance sensor or visual sensor. As a result, it was difficult to improve the success rate of the work with respect to the worked objects which cannot be measured by the distance sensor or visual sensor.

For example, in case of screwing up to plate members each having a coupling hole, only the coupling hole in the sensor-side (upper) plate member can be measured. Therefore, when the coupling holes in the upper and lower plate members were offset, the coupling hole in the lower plate member could not be measured, resulting in that the two plate members could not be screwed up even though the teaching point(s) of the work executive section was corrected according to the coupling hole in the upper plate member.

Further, according to the conventional method, since it is necessary to measure the position in which the worked object is fixed by means of the distance sensor or visual sensor for each work and since the measuring time is relatively long, the cycle time is prolonged disadvantageously.

SUMMARY OF THE INVENTION

An object of the present invention is to provide a robot control system which is capable of improving automatically the success rate of the work even if a worked object is unmeasurable or not observable by a distance sensor or visual sensor as well as of reducing the cycle time.

To this end, according to a first aspect of the present invention, there is provided a robot control system which comprises a tool or work executive section constituted by a mechanism or mechanical port of a robot for performing a work to a workpiece or object to be worked, means for setting in the work executive section a teaching point at which the work is to be performed, and control means for controlling operation of the work executive section in accordance with the teaching point, the robot control system further comprising: means for storing the set or corrected teaching point; work instruction means for making the work executive section move to the stored teaching points so as to perform the work; work judging means for determining a success rate of the work at the teaching point; search instruction means for making the work executive section move to a plurality of searching points set beforehand around the teaching point so as to perform the work or search; search judging means for judging the result of the work at each of the searching points so as to grasp the success rate at each of the searching points; and correction means for correcting the teaching point based on the relative relation between the success rate of the work at the teaching point and the success rate at each of the searching points.

It is well known that when the work at the teaching point was a failure, the peripheral search is to be performed about the teaching point. However, according to the robot control system of the first aspect of the invention, it is possible to correct automatically the teaching point by correcting the teaching point based on the success rate at the searching points and the success rate at the teaching point without confirming by sensor the offset of the position of the matter or object to be worked which might not be caused otherwise when the lot of the worked matter is changed. Since no sensor is required as described above, it is possible to use the present invention even in a working environment where the measurement of the position by a sensor cannot be performed.

According to a second aspect of the invention, there is provided a robot control system which comprises a tool or work executive section constituted by a mechanism or mechanical part of a robot for performing a work to a workpiece or object to be worked, means for setting in the work executive section a teaching point at which the work is to be performed, and control means for controlling operation of the work executive section in accordance with the teaching point, the robot control system further comprising: means for storing the set or corrected teaching point; work instruction means for making the work executive section move to the stored teaching point so as to perform the work; means for judging whether or not the work at the teaching point was a success; search instruction means for making the work executive section move to a plurality of searching points set beforehand around the teaching point so as to perform the work or search when the work at the teaching point was a failure and for breaking off the search when the work was a success; search judging means for judging the result of the work at each of the searching points so as to grasp the success rate at each of the searching points; and correction means for correcting the teaching point, when the number of failures of the work at the teaching point reaches a predetermined threshold value and the success rate at each of the searching points is decided substantially, so as to approach the best searching point (Pi) at which the highest success rate is obtained among the searching points in accordance with the success rate at each of the searching points from the search judging means.

The work such as to chuck a small lamp is to be performed after teaching the teaching point to the robot, and however, the position of the lamp or the like to be set is shifted delicately with the lapse of time. According to the robot control system of the second aspect of the invention, however, if it was failed to chuck the lamp at the reaching point, the work to chuck the lamp is to be performed at the predetermined searching points. The searching points are set at a plurality of points which are separated from the teaching point by a predetermined distance in the direction of X and Y axes, for example. The work to chuck the lamp is performed repeatedly at the respective searching points until the work at the searching point is successful.

In this way, although the work is usually performed at the teaching point, the work at the searching point is performed occasionally. There is provided, according to the second aspect of the invention, the search judging means which serves to grasp the rate or proportion of the number of successful works at each of the searching points to the number of works performed thereat, that is, the success rate at each of the searching points. In this case, even if the success rate at each of the searching points is obtained after performing the search only a small number of repetitions, it is impossible to conclude without question that the success rate thus obtained is the true success rate at each of the searching points (The search may have happened to be successful). However, the success rate at each of the searching points obtained after performing the search a certain large number of repetitions becomes the reliable data.

In consequence, when the number of repetitions of the search exceeds a reliable number (which is grasped experimentally or statistically), that is, when the success rate at each of the searching points is substantially decided or established, the highest success rate is selected from the success rates at the searching points. Then, the teaching point is to be corrected toward the searching point thus selected. In case that the searching points are so set that the distance between the teaching point and each of the searching points is very small, a new teaching point may be set at the selected searching point itself. Further, it is possible to set a moved distance between the old teaching point and the new teaching point statistically from the success rate of the work at the teaching point and the success rate at the selected searching point. In an embodiment described later, the new teaching point is set at the selected searching point itself.

According to a third aspect of the invention, there is provided a robot control system which comprises a tool or work executive section constituted by a mechanism or mechanical part of a robot for performing a work to a workpiece object to be worked, means for setting in the work executive section a teaching point at which the work is to be performed, and control means for controlling operation of the work executive section in accordance with the teaching point, the robot control system further comprising: means for storing the set or corrected teaching point; work instruction means for making the work executive section move to the stored teaching point so as to perform the work; means for determining a success rate of the work at the teaching point; means for calculating a searching distance from the success rate of the work at the teaching point; search instruction means for making the work executive section move, after performing the work at the teaching point, to a plurality of searching points each separated from the teaching point by the searching distance so as to perform the work or search; search judging means for judging the result of the work at each of the searching points so as to grasp the success rate at each of the searching points; and correction means for specifying a specific searching point and correcting the teaching point toward the specific searching point when there is a significant difference between the success rate of the work at the teaching point ($P_0$) and that at specified one of the searching points and the success rate at the specified one of the searching points is higher than that at the teaching point.

The lower the success rate at the teaching point is, the longer the distance between the teaching point at present and a point at which the true or actual teaching point is to be set is. According to the robot control system of the third aspect of the invention, therefore, a searching distance is to be calculated from the success rate of the work at the teaching point. A plurality of searching points are to be set according to the searching distance thus calculated.

After performing the work at the teaching point and determining the success rate thereof (a certain number of repetitions of the work being required to decide or establish the success rate), the work is to be performed at one of the searching points so as to grasp the success rate thereat. Subsequently, it is to be judged whether or not there is a substantial difference or a significant difference between the success rate at the teaching point and the success rate at the above-described one of the searching points. This judgement is performed by making use of a material or statistical formula or function which depends on the numbers of assemblings at the teaching point and the above-described one of the searching points.

Presence of the significant difference means that the assembling was performed such a number of repetitions that permits the success rates to be regarded as being reliable, and that there is a difference between the success rates. When there is a significant difference and the success rate at a searching points is higher than the success rate of the work at the teaching point, the searching point (Pi) is specified as a specified searching point.

Pressure of such specified searching point means that a point to be set as the true teaching point is moved to the specific searching point, and therefore, the teaching point is to be corrected toward the specified searching point so as to be newly set.

The above-mentioned and other objects, features as well as advantages of the invention will be made clearer by the description of the preferred embodiments of the invention referring to the drawings.

BRIEF DESCRIPTION OF DRAWINGS

FIGS. 1 to 4 show a first embodiment of the present invention, in which:

FIGS. 5 to 10 show a second embodiment of the invention, in which:

DESCRIPTION OF PREFERRED EMBODIMENTS

Description will be given of an industrial robot of the present invention based on embodiments shown in FIGS. 1 to 13.

Figure 1:
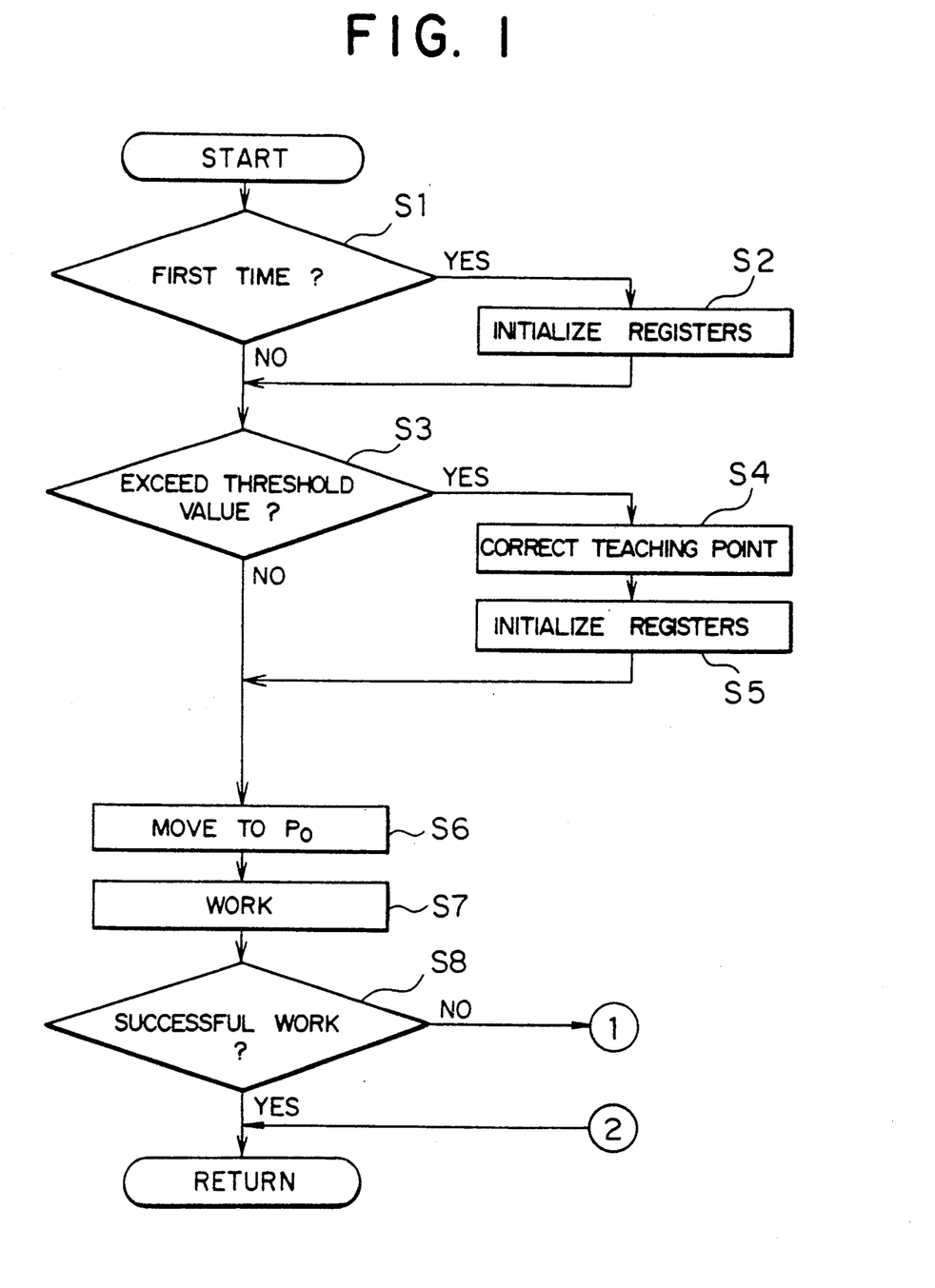
FIGS. 1 and 2 are flow charts or sheets representing an algorithm of a program for a robot control system according to the first embodiment of the invention.
Figure 2:
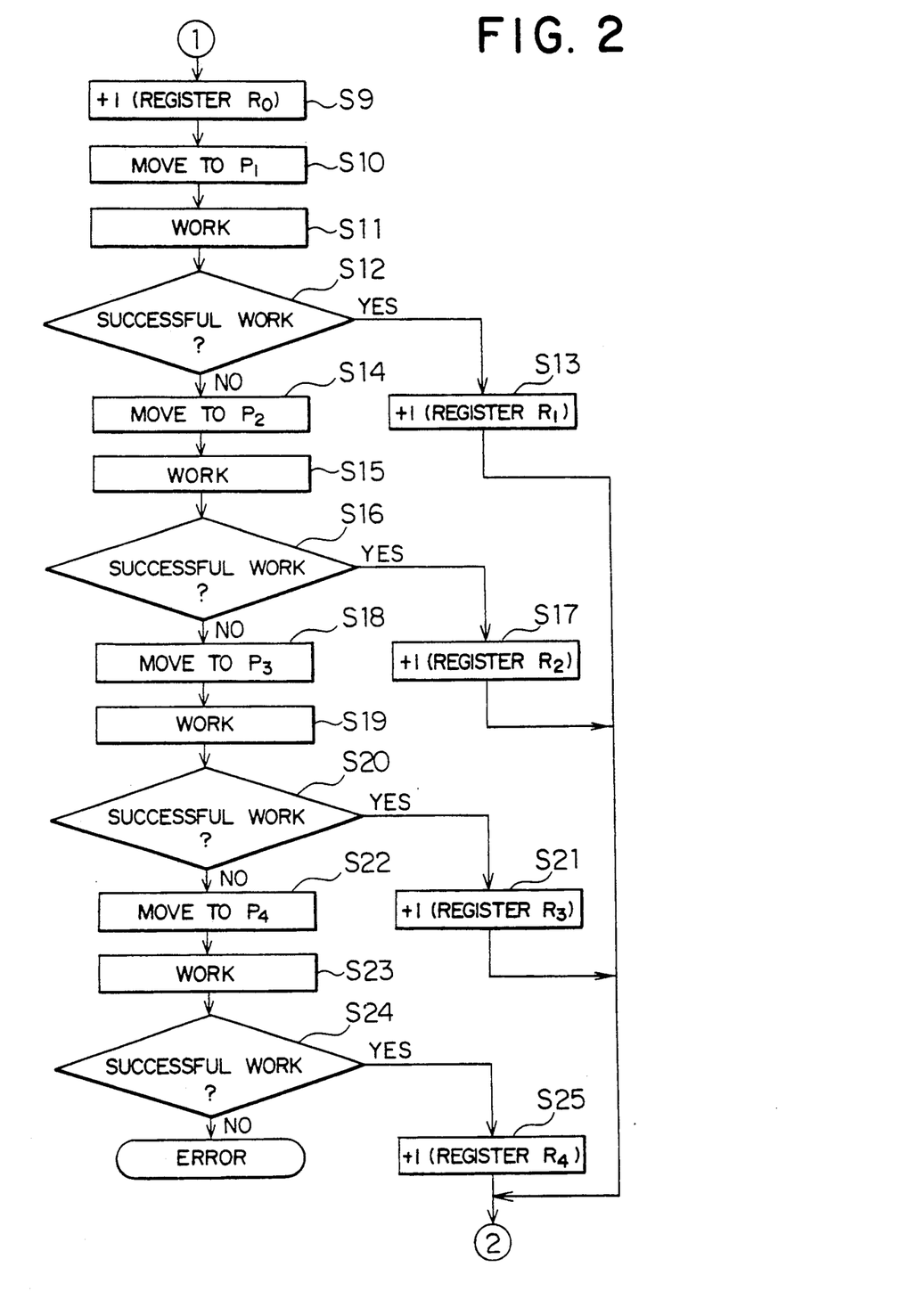
Figure 3:
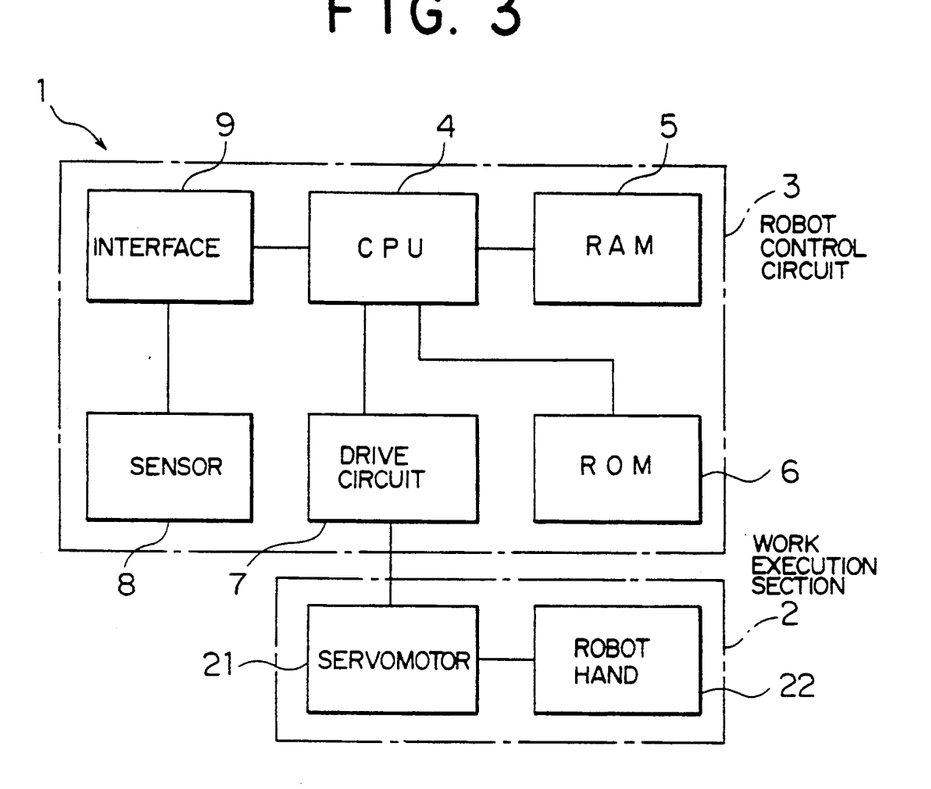
FIG. 3 is a block diagram of the robot control system according to the first embodiment of the invention.

FIGS. 1 to 4 show the first embodiment of the invention. FIGS. 1 and 2 are flow charts showing how to correct the offset or deviation of the position of the industrial robot, and FIG. 3 is a block diagram of a robot control system.

A robot control system 1 has a work execution section or tool section 2 and a robot control circuit 3.

Figure 4:
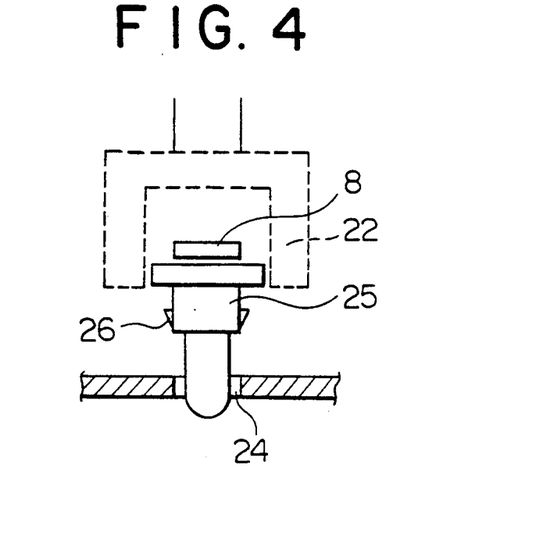
FIG. 4 is a schematic view showing a work to insert a lamp into a hole formed in a base plate.

The work execution section 2 comprises a servomotor 21 and a robot hand 22. The servomotor 21 drives the robot hand 22 according to an instruction issued from the robot control circuit of the robot control system 1. The robot hand 22 is driven by the servomotor 21 to insert a lamp 25 into a hole 24 of a base plate 23 as shown in FIG. 4, thereby assembling or mounting the lamp 25 to the base plate 23. The lamp 25, when assembled to the base plate 23, is to be fixed to the base plate 23 due to engagement of pawls 26 on the outer periphery with the base plate 23.

The robot control circuit 3 serving as the control means of the invention comprises a central processing unit (referred to as a CPU, hereinafter) 4, a random access memory (referred to as RAM, hereinafter) 5, a read-only memory (referred to as ROM, hereinafter) 6 and a driving circuit 7.

The CPU 4 receives signals from a sensor 8 for judging the result of the work via an interface 9 for transforming signals so as to set the sensor signal from the sensor 8. The CPU 4 has a function of teaching the work execution section 2 what to operate as well as a function of correcting the teaching point to the best working point detected from the teaching point $P_0$ and searching points $P_1$ to $P_4$ separated from the teaching point $P_0$ by a searching distance L in four directions (see FIG. 8) in accordance with the sensor signal.

The sensor 8 is disposed on the robot hand 22 so as to be turned or set "ON" when the robot hand 22 holds the lamp 25 at its chucking position. In case that the robot hand 22 performs the work, the sensor 8 is turned or set "OFF" when the lamp 25 is removed from the robot hand 22 (or the work was a success) and, on the other hand, maintained to be set "ON" when the lamp 25 remains in the robot hand 22 (or the work was a failure). Namely, the CPU 4 judges that the work was a success when the sensor 8 is set "OFF" and that the work was a failure when the sensor 8 is maintained to be set "ON".

The RAM 5 is a memory in which the teaching data taught by the CPU 4 can be written. When the teaching data is corrected by the CPU 4, the teaching data stored in the RAM 5 is renewed or updated from the preceding one to the new one. Further, the RAM 5 comprises a register $R_0$ for storing the number of failed works at the teaching point $P_0$ and registers $R_1$ to $R_4$ for storing the number of successful works at the searching points $P_1$ to $P_4$ respectively.

The ROM 6 is a fixed memory for storing the procedure (or the program to control according to the invention) for controlling the work execution section 2 based on the teaching data.

The driving circuit 7 serves to give instructions (such as to change the voltage and current) to the servomotor 21 according to the output of the CPU 4.

Now, the program will be described in conjunction with the flow charts of FIGS. 1 and 2.

It is to be judged whether or not the program is to be used for the first time (at step S1). If it is judged that the program is not to be used for the first time (No), control proceeds to step S3.

If it is judged as step S1 that the program is to be used for the first time (Yes), the registers $R_0$, and $R_1$ to $R_4$ are initialized by substituting 0 (zero) into the number of failed works and the numbers of successful works stored in these registers (at step S2). It is to be judged whether or not the number of failed works stored in the register $R_0$ exceeds the threshold value (at step S3). If it is judged that the number of failed works does not exceed the threshold value (No), control proceeds to step S6.

It is noted that the threshold value means the number of searches which permits decision of the success rate at the searching points to by assured within the range of allowable error, and it may be set experimentally or statistically at 300, for example.

If it is judged at step S3 that the number of failed works exceeds the threshold value (Yes), the teaching point $P_0$ is corrected or changed to an i-th searching point Pi at which the number of successful works stored in the register $R_1$ to $R_4$ is maximum (at step S4), and the registers $R_0$, $R_1$ to $R_4$ are initialized by substituting "0" into the number of failed works and the numbers of successful works stored in these registers (at step S5).

Then, the robot hand 22 is moved to the teaching point $P_0$ (at step S6) where the robot hand 22 is made to perform the work (at step S7).

It is to be judged whether or not the work was a success by getting or receiving the sensor signal from the sensor 8 (at step S8). If it is judged that the work was a success (Yes), the program is returned.

If it is judged at step S8 that the work was a failure (No), "1 (one)" is added to the number of failed works stored in the register $R_0$ (at step S9). Then, the robot hand 22 is moved to the searching point $P_1$ (at step S10)

where the robot hand 22 is made to perform the work (at step S11).

It is to be judged whether or not the work was a success (at step S12). If it is judged that the work was a success (Yes), "1" is added to the number of successful works stored in the register $R_1$ (at step S13), and thereafter, the program is returned.

If it is judged at step S12 that the work was a failure (No), the robot hand 22 is moved to the searching point $P_2$ (at step S14) where the robot hand 22 is made to perform the work (at step S15).

It is to be judged whether or not the work was a success (at step S16). If it is judged that the work was a success (Yes), "1" is added to the number of successful works stored in the register $R_2$ (at step S17), and then, the program is returned.

If it is judged at step S16 that the work was a failure (No), the robot hand 22 is moved to the searching point $P_3$ (at step S18) where the robot hand 22 is made to perform the work (at step S19).

It is to be judged whether or not the work was a success (at step S20). If it is judged that the work was a success (Yes), "1" is added to the number of successful works stored in the register $R_3$ (at step S21), and thereafter, the program is returned.

If it is judged at step S20 that the work was a failure (No), the robot hand 22 is moved to the searching point $P_4$ (at step S22) where the robot hand 22 is made to perform the work (at step S23).

It is to be judged whether or not the work was a success (at step S24). If it is judged that the work was a success (Yes), "1" is added to the number of successful works stored in the register $R_4$ (at step S25), and then, the program is returned.

If it is judged at step S24 that the work was a failure (No), it is considered that there arises an error.

Operation of the program of the first embodiment will be further described with reference to FIGS. 3 and 4. Before using or executing the program, the searching distance L and the threshold value M of the number of failed works is set. In case of using the program for the first time, the registers $R_0$, $R_1$ to $R_4$ are initialized by substituting "0" into the number of failed works and the numbers of successful works stored in these registers.

The robot hand 22, after chucking the lamp 25 at the chucking position of the latter, is moved to the teaching point $P_0$ so as to insert the lamp 25 into the hole 24 of the base plate 23. In this case, if the work was a success, the lamp 25 can be fixed due to engagement of the pawls 26 of the lamp 25 with the base plate 23. Then, at the robot hand 22 is moved upwards, the lamp 25 is released from the robot hand 22. In consequence, the output of the sensor 8 is turned from "ON" to "OFF".

On the other hand, if the work was a failure, the lamp 25 remains in the robot hand 22 so that the output of the sensor 8 is maintained to be set "ON".

Then, the CPU 4 judges the result of the work in accordance with the output of the sensor 8. If the output of the sensor is "ON", "1" is added to the number of failed works stored in the register $R_0$ and the robot hand 22 is moved to the searching point $P_1$ at a distance $+L$ (in x-coordinate, for example) $+X$ from the teaching point $P_0$ so as to be made to perform the work again.

If the output of the sensor 8 is "OFF", "1" is added to the number of successful works stored in the register $R_1$ and the program is repeated from the beginning.

If the work was a failure, the work is to be repeated while changing the searching points $P_2$ to $P_4$ (spaced from $P_0$ by -L in x-coordinate, +L in y-coordinate, and -L in y-coordinate respectively, for example) one by one, and "1" is added to the number of successful works stored in one of the registers $R_2$ - $R_4$ corresponding with the associated one of the searching points $P_2$ - $P_4$ at which the work was a success.

In this way, the program is used or executed repeatedly. When the number of failed works stored in the register $R_0$ reaches or exceeds the threshold value M set beforehand, the teaching point $P_0$ is corrected to one of the searching points $P_1$ to $P_4$ which corresponds with associated one of the registers $R_1$ to $R_4$ in which the maximum number of successful works is stored, and the registers $R_0$, $R_1$ to $R_4$ are initialized by substituting "0" into the number of failed works and the number of successful works stored in these registers.

By repeating the above-described processing of the program, it is possible to improve the success rate of the work automatically during the operation of the work executive section 2. Further, the sensor 8 for judging the result of the work may be an inexpensive one.

In addition, since the assembling position is not always measured by means of a distance sensor, a visual sensor or the like, it is not necessary to take time for measurements before the assembling. In consequence, it is possible not only to shorten the cycle time but also to make longer the effective operating time of the robot within the cycle time.

Figure 5:
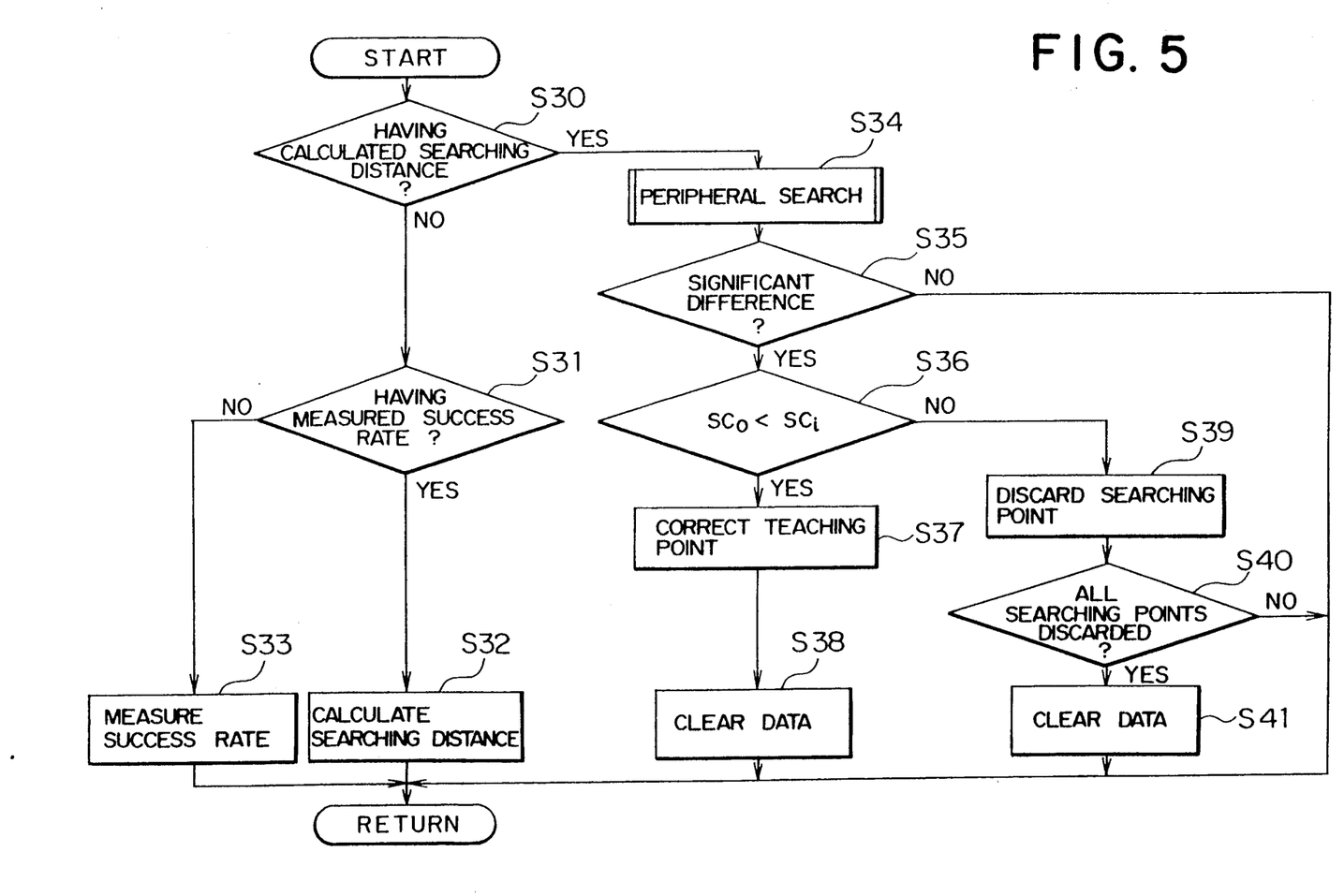
FIG. 5 is a flow chart representing an algorithm of a program for a robot control system according to the second embodiment of the invention.

FIGS. 5 to 10 show a second embodiment of the invention. FIG. 5 is a flow chart showing how to correct the offset of the position of the industrial robot used for assembling the lamp 25 to the base plate 23 likewise the first embodiment.

It is to be judged whether or not a searching distance L, has been calculated (at step S30). If it is judged that the searching distance L has not been calculated (No), it is to be judged whether or not a success rate $SC_0$ of the work at the teaching point $P_0$ has been measured (at step S31). If it is judged that the success rate of work $SC_0$ has been measured (Yes), the searching distance L is calculated (at step S32), and then, the program is returned.

If it is judged at step S31 that the success rate of work $SC_0$ has not been measured (No), the success rate of work $SC_0$ of the teaching point $P_0$ is measured (at step S33), and then, the program is returned.

Figure 6:
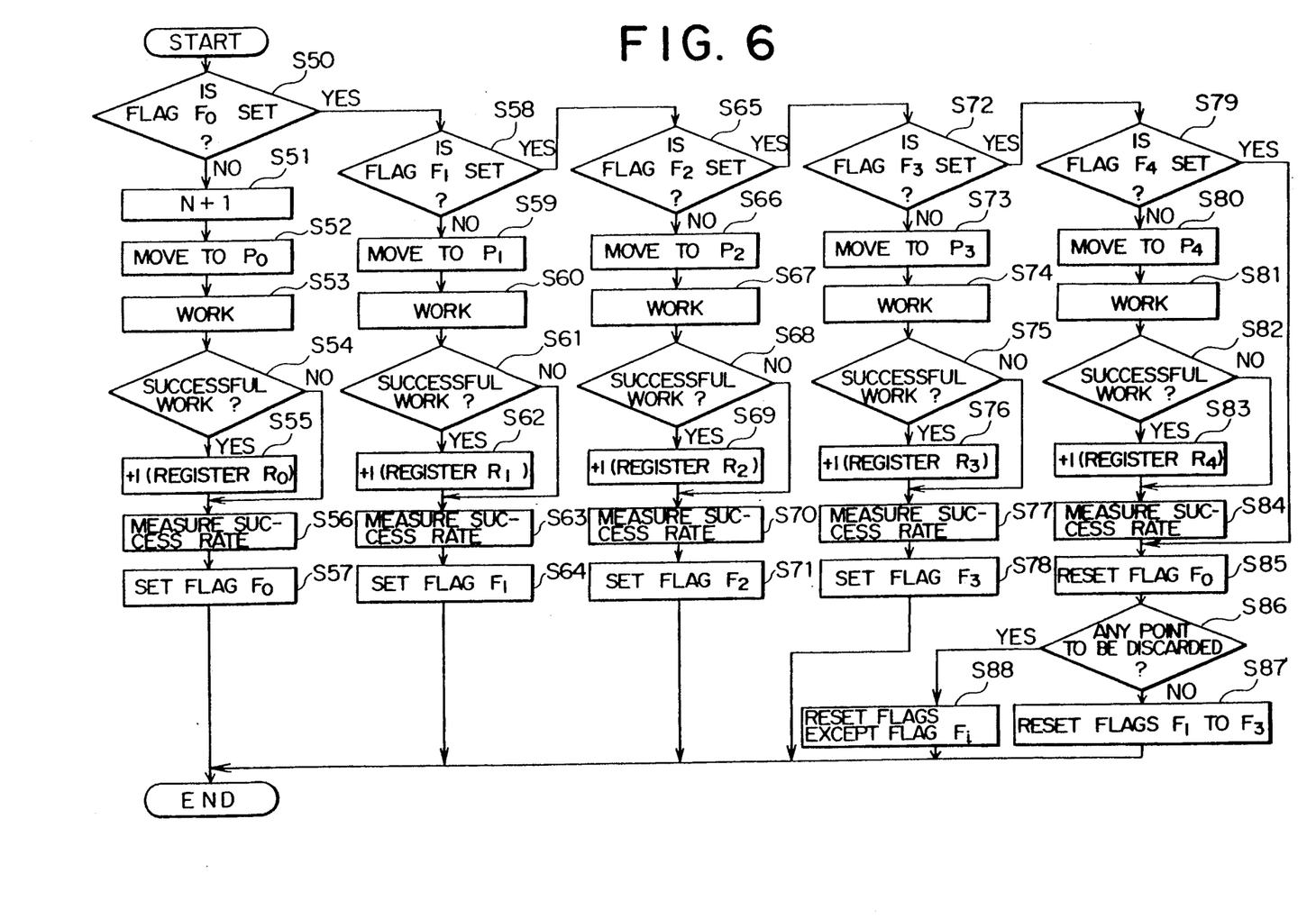
FIG. 6 is a flow chart representing an algorithm of subtrouble, of the program of FIG. 5, a peripheral search.

If it is judged a step S30 that the searching distance L has been calculated (YES), a peripheral search subroutine shown in FIG. 6 is carried out (at step S34) so as to judge whether or not there is a significant difference between the success rate $SC_0$ at the teaching point $P_0$ and the success rate $SC_i$ at the i-th searching point Pi (at step S35). If it is judged that there is no significant difference (No), the program is returned.

If it is judged at step S35 that there is the significant difference (Yes), it is to be judged whether or not the success rate $SC_i$ at the i-th searching point Pi is higher than the success rate $SC_0$ at the teaching point $P_0$ ($SC_0 < SC_i$) (at step S36). If it is judged that $SC_0 < SC_i$ is satisfied (Yes), the teaching $P_0$ is corrected to the i-th searching point Pi (at step S37). Then, the data (including the searching distance L, the number of assembling N, the success rate $SC_0$ at the teaching point $P_0$, the numbers of successful works at the teaching point $P_0$ and at the searching points $P_1$ to $P_4$, and reset of flags Fj (j=i) corresponding with the discarded searching point (Pj) are cleared (at step S38), and thereafter, the program is returned.

If it is judged that $SC_0 < SC_i$ is not satisfied (No), the flag Fi is set and the i-th searching point Pi is discharged (at step S39). Then, it is to be judged whether or not all the searching points $P_1$ to $P_4$ are discharged (at step S40). If it is judged that a part of the searching points $P_1$ to $P_4$ is not discarded (No), the program is returned.

If it is judged at step S40 that all the searching point $P_1$ to $P_4$ are discharged (Yes), the data (including the searching distance L, the number of assemblings N, the success rate $SC_0$ at the teaching point $P_0$, the numbers of successful works at the teaching point $P_0$ and at the searching points $P_1$ to $P_4$, and reset of flags $F_1$ to $F_4$) are cleared (at step S41), and then, the program is returned.

FIG. 6 is a subroutine used to carry out the peripheral search.

It is to be judged whether or not a flag $F_0$ is set (at step S50).

If it is judged that the flag $F_0$ is not set (No), the stored number of assemblings N is added with "1" and then stored in the RAM 5 (at step S51). Then, the robot hand 22 is moved to the teaching point $P_0$ (at step S52) where the robot hand 22 is made to perform the work (at step S53).

It is to be judged whether or not the work was a success by getting the sensor signal from the sensor 8 (at step S54). If it is judged that the work was a success (Yes), "1" is added to the number of successful works stored in the resistance $R_0$ (at step S55) and the success rate of the work of the teaching point $P_0$ is measured or calculated (at step S56). Then, the flag $F_0$ is set (at step S57) and control is returned to the program.

If it is judged at step S54 that the work was a failure (No), control proceeds to step S56.

If it is judged at step S50 that the flag $F_0$ is set (Yes), it is to be judged whether or not the flag $F_1$ is set (at step S58).

When it is judged that the flag $F_1$ is not set (No), the robot hand 22 is moved to the searching point $P_1$ (at step S59) where the robot hand 22 is made to perform the work (at step S60).

It is to be judged whether or not the work was a success (at step S61). If it is judged that the work was a success (Yes), "1" is added to the number of successful works stored in the register $R_1$ (at step S62) and the success rate of the work at the searching point $P_1$ is measured (at step S63). Then, the flag $F_1$ is set (at step S64) and control is returned to the program.

If it is judged at step S61 that the work was a failure (No), control proceeds to step S63.

If it is judged at step S58 that the flag $F_1$ is set (Yes), it is to be judged whether or not the flag $F_2$ is set (at step S65).

When it is judged that the flag $F_2$ is not set (No), the robot head 22 is moved to the searching point $P_2$ (at step S66) where the robot hand 22 is made to perform the work (at step S67).

It is to be judged whether or not the work was a success (at step S68). If it is judged that the work was a success (Yes), "1" added to the number of successful works stored in the register $R_2$ (at step S69) and the success rate of the work at the searching point $P_2$ is measured (at step S70). Then, the flag $F_2$ is set (at step S71) and control is returned to the program.

If it is judged at step S68 that the work was a failure (No), control proceeds to step S70.

If it is judged at step S65 that the flag $P_2$ is set (Yes), it is to be judged whether or not the flag $F_3$ is set (at step S72).

When it is judged that the flag $F_3$ is not set (No), the robot hand 22 is moved to the searching point $P_3$ (at step S73) where the robot hand 22 is mode to perform the more (at step S74).

It is to be judged whether or not the work was a success (at step S75). When it is judged that the work was a success (Yes), "1", is added to the number of successful works stored in the register $R_3$ (at step S76) and the success rate of the work at the searching point $P_3$ is measured (at step S77). Then, the flag $F_3$ is set (at step S78) and control is returned to the program.

If it is judged at step S75 that the work was a failure (No), control proceeds to step S77.

If it is judged at step 72 that the flag $F_3$ is set (Yes), it is to be judged whether or not the flag $F_4$ is set (at step S79).

When it is judged that the flag $F_4$ is not set up (No), the robot hand 22 is moved to the searching point $P_4$ (at step S80) where the robot hand 22 is made to perform the work (at step S81).

It is to be judged whether or not the work was a success (at step S82). When it is judged that the work was a success (Yes), "1" is added to the number of successful works stored in the register $R_4$ (at step S83) and the success rate of the work at the searching point $P_4$ is measured (at step S84). Then, the flag $F_0$ is reset (at step S85) and it is to be judged whether or not any of the searching points $P_1$ to $P_3$ is to be discarded (at step S86). When it is judged that no searching point is to be discharged (No), the flags $F_1$ to $F_3$ are reset (at step S87) and control is returned to the program.

If it is judged that one Pi of the searching points is to be discarded (Yes), the flags Fi ($j \neq i$) other than the flag $F_1$ corresponding with the i-th searching point Pi to be discarded are reset (at step S88) and control is returned to the program.

If it is judged at step 82 that the work was a failure (No), control proceeds to step S84.

When it is judged at step S79 that the flag $F_4$ is set (Yes), control proceeds to step S85.

Operation of the robot control system 1 according to the second embodiment will be described with reference to FIGS. 7 to 10.

In case of using or executing the program for the first time, the searching distance L must be calculated. To calculate the searching distance L, the success rate $SC_0$ at the teaching point $P_0$ is measured at first. After performing the work at the teaching point $P_0$ by the required number of assemblings, the success rate is obtained by dividing the number of successful works by the number of tried assemblings. However, in order to measure the success rate, such a function is to be used that is in proportion to the success rate at that time. As an example of such function, equation (1) can be used.

$$\text{Required number of assemblings} = 290 \times \text{success rate} + 10 \quad (1)$$

In case of using the equation (1), assembling is to be performed ten times at the minimum even when the success rate is 0% and 300 times when the success rate is 100%. In this way, since the number of assemblings is increased as the success rate becomes higher, the success rate of the work can be measured with high accuracy.

When the number of assemblings satisfies the required number of assemblings, the searching distance L is to be calculated. The searching distance L is obtained as a function f of the success rate obtained earlier as shown by equation (2).

Searching distance = f (success rate)       (2)

Figure 7:
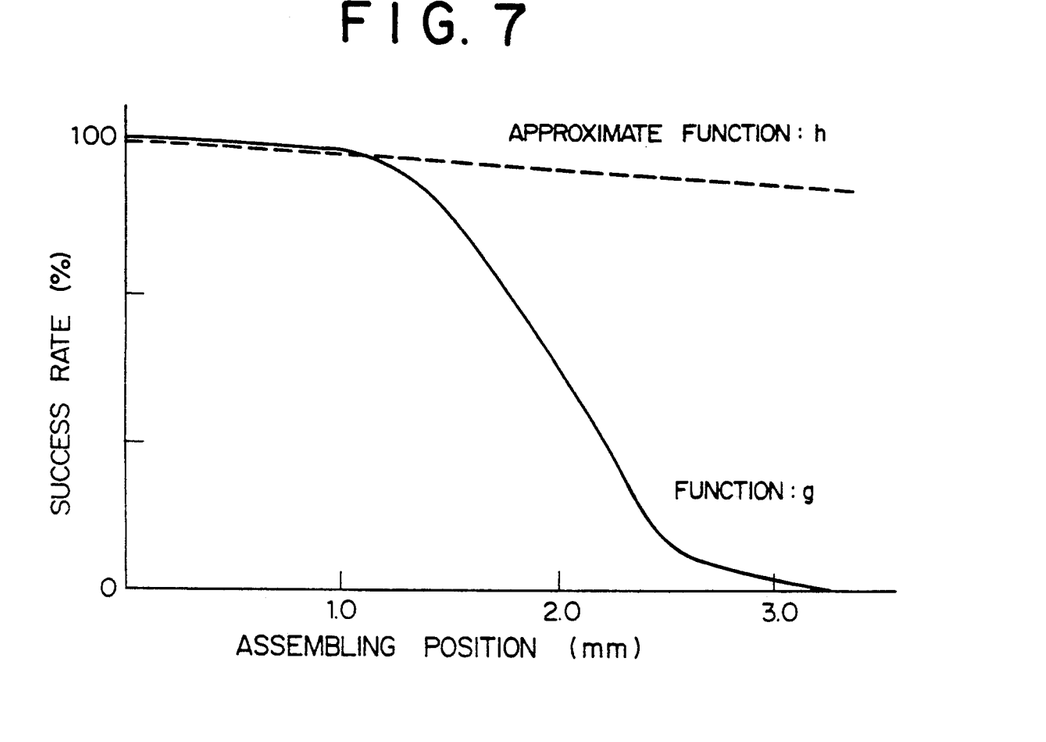
FIG. 7 is a graph showing the relationship between the success rate of the work and the teaching point.

The function f (success rate) in the equation (2) is an inverse function of a success rate function g (position) where "position" means the predetermined assembling position (original teaching point $P_0$) and as shown in the graph or FIG. 7.

It is noted here that the function f (success rate) is not always the very inverse function of the function g (position). An approximate function h (success rate) shown in the graph of FIG. 7 may be used when the offset or deviation in the position of the teaching point $P_0$ is relatively small.

Subsequently, after the searching distance L has been calculated, in the course of executing the program, the peripheral search is carried out based on the searching distance L. In other words, each time the program is executed, works are carried out at the teaching point $P_0$ and other different searching points in turn so as to store the success rates at the respective points.

Figure 8:
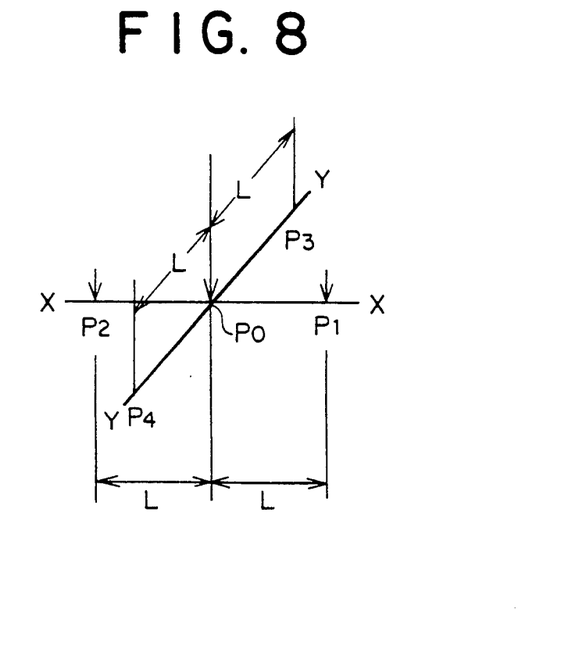
FIG. 8 is a schematic view showing the teaching point and searching points associated therewith.

In case of correcting the position in a plane, for example, the peripheral search is performed by measuring the success rates at four points including two points (searching points $P_1$ and $P_2$) which are separated from the teaching point $P_0$ in the direction of X axis by $\pm$calculated searching distance L and another two points (searching points $P_3$ and $P_4$) which are separated from the teaching point $P_0$ in the direction of Y axis by $\pm$calculated searching distance L, as shown in FIG. 8.

Each time the assembling at the searching point $P_i$ is finished, it is judged whether or not the difference in the success rate between at the teaching point $P_0$ and at the searching point $P_i$ is a significant difference. Judgement is performed by making use of formula (3) below. 1.96 is a reference value used in the case that judgement is performed in consideration of the misjudgement rate of 5%.

$$\frac{|SC_0 - SC_i|}{\sqrt{SC(1 - SC) \times 2N}} > 1.96 \qquad (3)$$

where
SC : average value of the success rates $SC_0$ and $SC_i$
N : number of assemblings (number of assemblings at the teaching point $P_0$ being equal to that at the searching point $P_i$)
$SC_0$: success rate at the teaching point $P_0$
$SC_i$: success rate at the i-th searching point $P_i$ If the right side value of the formula (3) is greater than the left side value according to the formula (3), it is considered that there is a significant difference between the success rate at the teaching point $P_0$ and the success rate at the i-th searching point $P_i$.

If there is no significant difference, works are continued with respect to the succeeding searching point or the teaching point $P_0$. If there is the significant difference and the success rate at the i-th searching point $P_i$ is higher than that at the teaching point $P_0$, the teaching point $P_0$ is corrected to the i-th searching point $P_i$. On the other hand, if there is the significant difference and the success rate at the i-th searching point $P_i$ is lower than that at the teaching point $P_0$, the i-th searching point $P_i$ is discarded and then the works are continued with respect to the other searching points or the teaching point $P_0$.

If all the searching points are discharged, it is considered that the success rate at the teaching point $P_0$ is the highest. In consequence, data (including the searching distance L, the number of assemblings N, the success rate at the teaching point $P_0$, and the numbers of successful works at the teaching point $P_0$ and at the searching points $P_1$ to $P_4$) are cleared and the program is started again from the calculation of the searching distance L.

Figure 9:
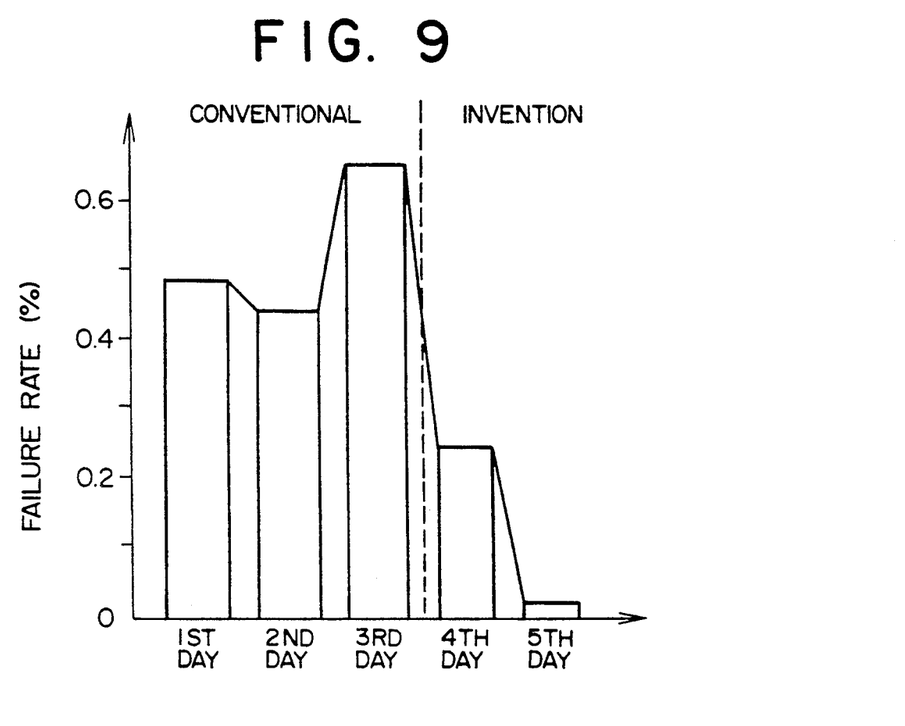
FIG. 9 is a graph for comparison of the average percent defective per day between the system according to the second embodiment of the invention and a conventional system.
Figure 10:
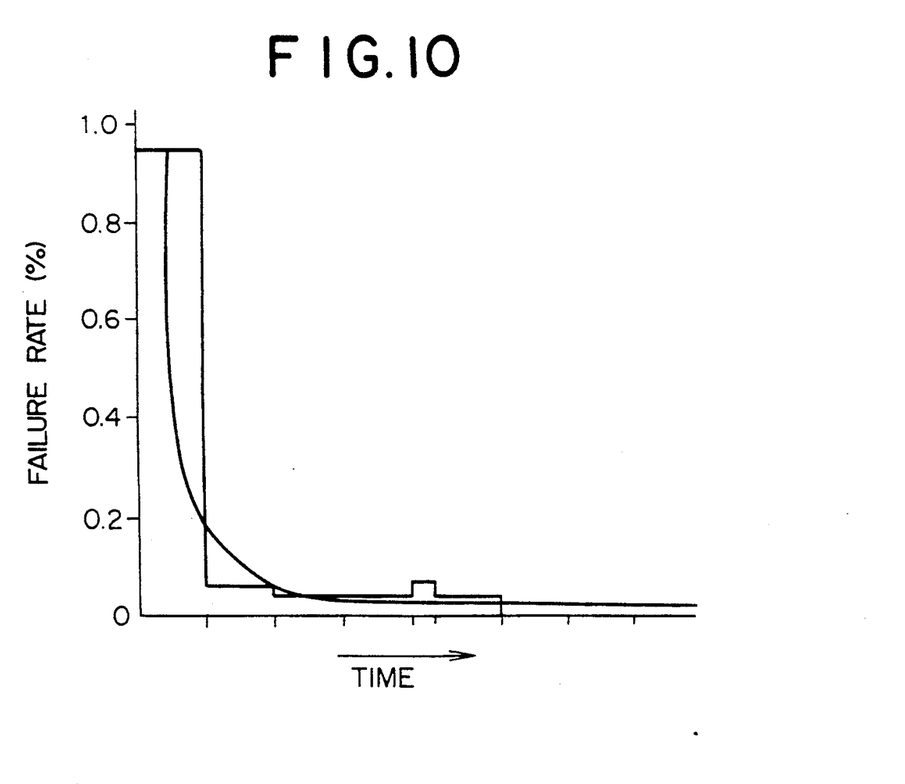
FIG. 10 is a graph showing changes of average percent defectives per two hours in the system according to the second embodiment of the invention.

By repeating the above-described operation, corrections can be done automatically in the system according to the second embodiment of the invention so as to make higher the success rate but lower the percent defective as shown in the graph of FIG. 9. Therefore, as shown in the graph of FIG. 10, it is possible to reduce the failure rate or percent defective even when the invention is applied to the conventional ones. This system is advantageous in that the assembling speed is the same both when the assembling is performed at the teaching point $P_0$ and when the assembling is performed at the searching point $P_i$.

Figure 11:
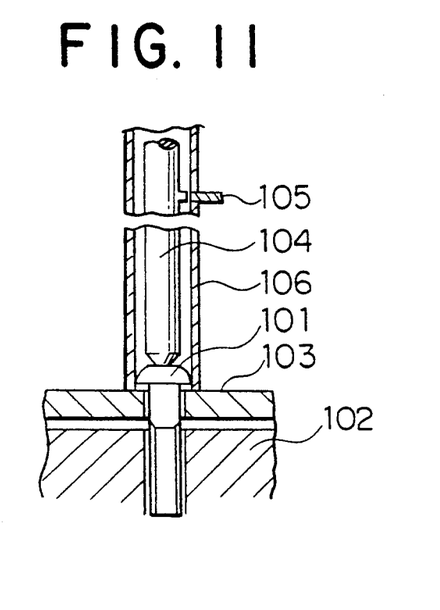
FIG. 11 is a schematic view of a part of a robot control system according to a third embodiment of the invention, showing a screwing work.

FIG. 11 is a view for explanation of the screwing work according to a third embodiment of the present invention.

In this screwing work, the accuracy of torque depends on not only the screwing position of a cover base plate 103 to be screwed to a base plate 102 with a screw 101 but also the rotational speed of a screwing motor (not shown) of a screw tightening mechanism. For this reason, in this embodiment, a torque sensor 105 is adopted by which it is judged that the work was a success when the torque of a screwdriver 104 is within the prescribed torque and that the work was a failure when beyond the prescribed torque.

It is noted here that reference numeral 106 denotes a guide cylinder for serving to guide the screw 101 and the screwdriver 104 to the screwing position of the base plate 102.

Figure 12:
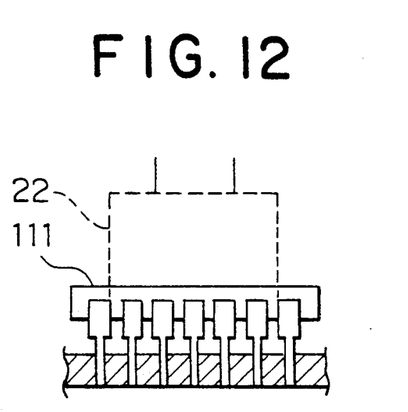
FIGS. 12 and 13 are schematic views of a part of a robot control system according to a fourth embodiment of the invention, showing a work to insert an integrated circuit part into holes in a substrate.
Figure 13:
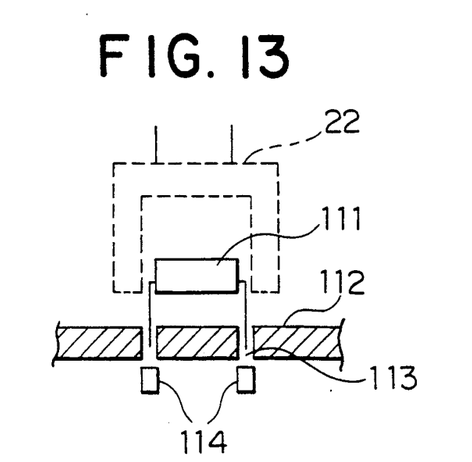

FIGS. 12 and 13 are views for explanation of the work to insert an integrated-circuit part into holes in a substrate according to a fourth embodiment of the invention.

In this embodiment, since an integrated-circuit part 111 is to be inserted into holes 113 in a substrate 112, search for the working point at which the best success rate of the work is obtained is performed about six searching points in terms of not only the translational position in the plane but also the direction of rotation. It is noted here that reference numeral 114 denotes a sensor for judging the result of the work.

Judging means is not limited to there shown in the above-mentioned embodiments so far as it is able to judge the result of the work. For example, contact position sensor, non-contact position sensor, displacement sensor, speed sensor, acceleration sensor and the like can be used.

The present invention is applicable to the robot control system of any type of industrial robot so far as the success rate of work depends on the speed, acceleration, force and the like which are to be applied in assembling.

Further, in the above-described embodiments, the teaching point is moved to the specific searching point itself, and however, it is also possible to set a new teaching point at a point which is moved by a desired distance determined beforehand so as to approach the specific searching point.

What is claimed is:

1. A robot control system having a work execution section constituted by a mechanism of a robot for performing a work to an object to be worked, means for setting in said work execution section a teaching point at which said work is to be performed, and control means for controlling operation of said work execution section in accordance with said teaching point, said robot control system comprising:

means for storing said set teaching point or a corrected teaching point;

work instruction means for making said work execution section move to said stored teaching point so as to perform said work;

work judging means for determining a success rate of said work at said teaching point;

search instruction means for making said work execution section move to a plurality of searching points set beforehand around said teaching point so as to perform said work or search;

search judging means for judging the result of said work at each of said searching points so as to determine a success rate at each of said searching points; and correction means for correcting said teaching point based on the relative relation between said success rate of the work at said teaching point and the success rate at each of said searching points.

2. A robot control system according to claim 1, wherein said work judging means determines the success rate of said work at said teaching point as a number of works thereat having been performed successfully divided by a total number of works having been performed thereat.

3. A robot control system according to claim 1, wherein said search judging means determines the success rate at each of said searching points as a number of said works thereat having been performed successfully divided by a total number of works having been performed thereat.

4. A robot control system according to claim 1, wherein said correction means corrects the teaching point based on a difference between the success rate of the work at said teaching point and the success rate at each of said searching points.

5. A robot control system having a work execution section constituted by a mechanism of a robot for performing a work to an object to be worked, means for setting in said work execution section a teaching point at which said work is to be performed, and control means for controlling operation of said work execution section in accordance with said teaching point, said robot control system comprising:

means for storing said set teaching point or a corrected teaching point;

work instruction means for making said work execution section move to said stored teaching point so as to perform said work;

means for judging whether or not said work at said teaching point was a success;

search instruction means for making said work execution section move to a plurality of searching points set beforehand around said teaching point so as to perform said work or search when said work at said teaching point was a failure and for breaking off said search when said work was a success;

search judging means for judging the result of said work at each of said searching points so as to determine a success rate at each of said searching points; and correction means for correcting said teaching point, when the number of failures of said work at said teaching point reaches a predetermined threshold value and the success rate at each of said searching points is decided substantially, so as to approach a best searching point at which the higher success rate is obtained among said searching points in accordance with the success rate of each of said searching points from said search judging means.

6. A robot control system according to claim 5, wherein said search judging means determines the success rate at each of said searching points as a number of said works thereat having been performed successfully divided by a total number of works having been performed thereat.

7. A robot control system having a work execution section constituted by a mechanism of a robot for performing a work to an object to be worked, means for setting in said work execution section a teaching point at which said work is to be performed, and control means for controlling operation of said work execution section in accordance with said teaching point, said robot control system comprising:

means for storing said set teaching point or a corrected teaching point;

work instruction means for making said work execution section move to said stored teaching point so as to perform said work;

means for determining a success rate of said work at said teaching point;

means for calculating a searching distance based on said success rate of the work at said teaching point;

search instruction means for making said work execution section move, after performing said work at said teaching point, to a plurality of searching points each separated from said teaching point by said searching distance so as to perform said work or search;

search judging means for judging the result of said work at each of said searching points so as to determine a success rate at each of said searching points; and correction means for specifying a specific searching point and correcting said teaching point toward said specific teaching point when there is a significant difference between the success rate of the work at said teaching point and that at the specified one of said searching points and the success rate at the specified one of said searching points is higher than that at said teaching point.

8. A robot control system according to claim 7, wherein said work judging means determines the success rate of said work at said teaching point as a number of works thereat having been performed successfully divided by a total number of works having been performed thereat.

9. A robot control system according to claim 7, wherein said search judging means determines the success rate at each of said searching points as a number of said works thereat having been performed successfully divided by a total number of works having been performed thereat.

10. A robot control method for a robot control system, the robot control system having a work execution section constituted by a mechanism of a robot for performing a work to an object to be worked, means for setting in said work execution section to a teaching point at which said work is to be performed, and control means for controlling operation of said work execution section in accordance with said teaching point, said robot control method comprising the steps of:

storing said set teaching point or a corrected teaching point;

moving said work execution section to said stored teaching point so as to perform said work;

determining a success rate of said work at said teaching point;

moving said work execution section to a plurality of searching points set beforehand around said teaching point so as to perform said work or search;

judging the result of said work at each of said searching points so as to determine a success rate at each of said searching points; and correcting said teaching point based on the relative relation between said success rate of the work at said teaching point and the success rate at each of said searching points.

11. A robot control system according to claim 10, wherein in said determining step, the success rate of said work at said teaching point is determined as a number of works thereat having been performed successfully divided by a total number of works having been performed thereat.

12. A robot control system according to claim 10, wherein in said judging step, the success rate at each of said searching points is determined as a number of said works thereat having been performed successfully divided by a total number of works having been performed thereat.

13. A robot control system according to claim 10, wherein in said corrected step, the teaching point is corrected based on a difference between the success rate of the work at said teaching point and the success rate at each of said searching points.

14. A robot control method for a robot control system, the robot control system having a work execution section constituted by a mechanism of a robot for performing a work to an object to be worked, means for setting in said work execution section to a teaching point at which said work is to be performed, and control means for controlling operation of said work execution section in accordance with said teaching point, said robot control method comprising the steps of:

storing said set teaching point or a corrected teaching point;

moving said work executive execution section to said stored teaching point so as to perform said work;

determining whether or not said work at said teaching point was a success;

moving said work execution section to a plurality of searching points set beforehand around said teaching point so as to perform said work or search when said work at said teaching point was a failure and breaking off said search when said work was a success;

judging the result of said work at each of said searching points so as to determine a success rate at each of said searching points; and correcting said teaching point, when the number of failures of said work at said teaching point reaches a predetermined threshold value and the success rate at each of said searching points is decided substantially, so as to approach a best searching point at which the higher success rate is obtained among said searching points in accordance with the success rate of each of said searching points.

15. A robot control system according to claim 14, wherein in said judging step, the success rate at each of said searching points is determined as a number of said works thereat having been performed successfully divided by a total number of works having been performed thereat.

16. A robot control method for a robot control system, the robot control system having a work execution section constituted by a mechanism of a robot for performing a work to an object to be worked, means for setting in said work execution section to a teaching point at which said work is to be performed, and control means for controlling operation of said work execution section in accordance with said teaching point, said robot control method comprising the steps of:

storing said set teaching point or a corrected teaching point;

moving said work execution section to said stored teaching point so as to perform said work;

determining a success rate of said work at said teaching point;

calculating a searching distance based on said success rate of the work at said teaching point;

moving said work execution section, after performing said work at said teaching point, to a plurality of searching points each separated from said teaching point by said searching distance so as to perform said work or search;

judging the result of said work at each of said searching points so as to determine a success rate at each of said searching points; and specifying one of said searching points; and correcting said teaching point toward said specific one of said searching points when there is a significant difference between the success rate of the work at said teaching point and that at the specified one of said searching points and the success rate at the specified one of said searching points is higher than that at said teaching point.

17. A robot control system according to claim 16, wherein in said determining step, the success rate of said work at said teaching point is determined as a number of works thereat having been performed successfully divided by a total number of works having been performed thereat.

18. A robot control system according to claim 16, wherein in said judging step, the success rate at each of said searching points is determined as a number of said works thereat having been performed successfully divided by a total number of works having been performed thereat.

* * * * *